(12) United States Patent
Juravicius

(10) Patent No.: US 11,615,157 B2
(45) Date of Patent: Mar. 28, 2023

(54) OPTIMIZING SCRAPING REQUESTS THROUGH BROWSING PROFILES

(71) Applicant: Oxylabs, UAB, Vilnius (LT)

(72) Inventor: Martynas Juravicius, Prienai district (LT)

(73) Assignee: Oxylabs, UAB, Vilnius (LT)

( * ) Notice: Subject to any disclaimer, the term of this patent is extended or adjusted under 35 U.S.C. 154(b) by 8 days.

(21) Appl. No.: 17/037,429

(22) Filed: Sep. 29, 2020

(65) Prior Publication Data

US 2022/0100808 A1    Mar. 31, 2022

(51) Int. Cl.
    *G06F 16/95*      (2019.01)
    *G06F 16/9535*      (2019.01)
    *G06F 16/951*      (2019.01)

(52) U.S. Cl.
    CPC ........ *G06F 16/9535* (2019.01); *G06F 16/951* (2019.01)

(58) Field of Classification Search
    USPC .......................................................... 707/706
    See application file for complete search history.

(56) References Cited

U.S. PATENT DOCUMENTS

| | | | | |
|---|---|---|---|---|
| 8,977,621 | B1 * | 3/2015 | Paiz ...................... | G06F 16/951 707/738 |
| 10,152,488 | B2 * | 12/2018 | Desineni ............... | G06F 16/954 |
| 10,965,770 | B1 * | 3/2021 | Vilcinskas ............. | H04L 67/02 |
| 2002/0188584 | A1 * | 12/2002 | Ghannam ............... | G06F 16/27 |
| 2009/0254971 | A1 * | 10/2009 | Herz ...................... | G06Q 10/10 726/1 |
| 2012/0259826 | A1 * | 10/2012 | Zalila-Wenkstern ...... G06F 16/954 707/706 |
| 2016/0371603 | A1 * | 12/2016 | A V ....................... | G06F 16/95 |
| 2018/0121677 | A1 * | 5/2018 | Avancha ............. | G06F 21/6254 |
| 2019/0102698 | A1 * | 4/2019 | Roberts ............... | G06F 21/6218 |
| 2021/0029089 | A1 * | 1/2021 | Lewin ................. | H04L 63/1408 |
| 2022/0070271 | A1 * | 3/2022 | Vasiliauskas ......... | H04L 67/101 |

* cited by examiner

*Primary Examiner* — Tamara T Kyle
*Assistant Examiner* — Raheem Hoffler
(74) *Attorney, Agent, or Firm* — FisherBroyles, LLP; Keats Quinalty

(57) ABSTRACT

Systems and methods of task implementation are extended as provided herein and target the web crawling process through a step of submitting a request by a customer to a web crawler. The systems and methods allow a request for a web crawler to be enriched with a customized browsing profile in order to be categorized as an organic human user to obtain targeted content. In one aspect, a method for data extraction and gathering from a Network by a Service provider infrastructure include at least some of the following exemplary steps: receiving and examining the parameters of a request received from a User's Device, enriching the request parameters with a pre-established browsing profile, sending the enriched request to a Target through the selected Proxy, receiving a response from the Target, dissecting the response's metadata that is appropriate for updating the browsing profile utilized for the request, and forwarding the data to the User's device pursuant to the examination of the response obtained from the Target system.

21 Claims, 11 Drawing Sheets

OPTIMIZING SCRAPING REQUESTS THROUGH BROWSING PROFILES

FIELD

In at least one aspect, the present disclosure relates to methods for optimizing the parameters of web scraping requests with the artefacts of human-like browsing behavior for obtaining the desired data while circumventing the blocking by the content owners.

BACKGROUND

The following sections will elaborate and clarify the technology notions the solution employs, is dependent upon, or is related to.

Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by executing a program that queries a web server and requests data automatically, then parses the data to extract the requested information.

Web scrapers—programs written for web scraping—can have a significant advantage over other means of accessing information, like web browsers. The latter are designed to present the information in a readable way for humans, whereas web scrapers are excellent at collecting and processing large amounts of data quickly. Rather than opening one page at a time through a monitor (as web browsers do), web scrapers are able to collect, process, aggregate and present large databases consisting of thousands or even millions of pages at once.

Sometimes the website allows another automated way to transfer its structured data from one program to another via an API. Typically, a program will make a request to an API via Hypertext Transfer Protocol (HTTP) for some type of data, and the API will return this data from the website in a structured form. It serves as a medium to transfer the data. However, using APIs is not considered web scraping since the API is offered by the website (or a third party) and it removes the need for web scrapers.

An API can transfer well-formatted data from one program to another and the process of using it is easier than building a web scraper to get the same data. However, APIs are not always available for the needed data. Also, APIs often use volume and rate restrictions and limit the types and the format of the data. Thus, a user would use web scraping for the data for which an API does not exist or which is restricted in any way by the API.

Usually, web scraping consists of the following steps: retrieving Hypertext Markup Language (HTML) data from a website; parsing the data for target information; saving target information; repeating the process if needed on another page. A program that is designed to do all of these steps is called a web scraper. A related program—a web crawler (also known as a web spider)—is a program or an automated script which performs the first task, i.e. it navigates the web in an automated manner to retrieve raw HTML data of the accessed web sites (the process also known as indexing).

Scraping activity may be performed/executed by multiple types of scraping applications, generally categorized as follows:

Browser—an application executed within a computing device, usually in the context of an end-user session, with the functionality sufficient to accept the user's request, pass it to the Target Web server, process the response from the Web server and present the result to the user. Browser is considered a user-side scripting enabled tool e.g. capable of executing and interpreting JavaScript code.

Headless browser—a web browser without a graphical user interface (GUI). Headless browsers provide automated control of a web page in an environment similar to popular web browsers but are executed via a command-line interface or using network communication. They are particularly useful for testing web pages as they are able to render and understand HTML the same way a browser would, including styling elements such as page layout, color, font selection and execution of JavaScript and AJAX which are usually not available when using other testing methods. Two major use cases can be identified:

scripted web page tests—with the purpose of identifying bugs, whereas a close resemblance to a user activity is necessary.

web scraping—where resemblance to a user activity is mandatory to avoid blocking. i.e. the request should possess all the attributes of an organic Web browsing request.

Headless browser is considered a user-side scripting enabled tool e.g. capable of executing and interpreting JavaScript code.

Command line tools—GUI-less applications that allow to generate and submit a Web request through a command line terminal e.g. CURL. Some tools in this category may have a GUI wrapped on top, but the graphical elements would not cover displaying the result of the HTTP request. Command line tools are limited in their functionality in that they are not capable of executing and interpreting JavaScript code.

Programming language library—a collection of implementations of behavior, written in terms of a language, that has a well-defined interface by which the behavior is invoked. For instance, when particular HTTP methods are to be invoked for executing scraping requests the scraping application can use a library containing said methods to make system calls instead of implementing those system calls over and over again within the program code. In addition, the behavior is provided for reuse by multiple independent programs, where the program invokes the library-provided behavior via a mechanism of the language. Therefore, the value of a library lies in the reuse of the behavior. When a program invokes a library, it gains the behavior implemented inside that library without having to implement that behavior itself. Libraries encourage the sharing of code in a modular fashion, and ease the distribution of the code. Programming language libraries are limited in their functionality in that they are not capable of executing and interpreting JavaScript code, unless there is another tool capable of user-side scripting, for which the library is a wrapper.

Combinations of the previous basic agent types that to a varying degree implement HTTP protocol methods and client-side scripting.

The response obtained from the web server generally consists of the following basic parts:

HTTP metadata, containing HTTP headers, cookies and HTTP response code.

the main HTML document additional files needed to process and render the finalized version of the web page: images, Cascading Style Sheet (CSS) files and JavaScript (JS) scripts.

The scraping application types listed above vary in the technical capabilities they possess, often due to the very purpose the application has been developed for. While sending the initial request to the target Web server all of the listed types of scraping applications pass the parameters mandatory for submitting and processing a web request. e.g. HTTP parameters—headers, cookies, declare the version of HTTP protocol they support and intend to communicate in, with Transmission Control Protocol (TCP) parameters disclosed while initiating the TCP session underlying the HTTP request (e.g. TCP Windows size and others). As described above browsers and headless browsers can process the JavaScript files obtained within the web server's response e.g. submit configuration settings through JavaScript when requested, while command line utilities are incapable of doing that.

While processing the web server's response all of the listed types of scraping applications are capable of obtaining, interpreting, rendering or otherwise processing, and presenting the HTTP metadata and the main HTML document, whereas some of the listed scraping applications do not possess the functionality of processing the additional files obtained from the web target's response e.g. executing scripted code client side. Therefore, a practical classification of web harvesting tools is based on their ability to execute and interpret JavaScript code.

As described above browsers and headless browsers can process the JavaScript files obtained within the web server's response e.g. submit configuration settings through JavaScript when requested, while command line utilities and programming language libraries are incapable of doing that.

While performing the scraping tasks the agent is subject to the same context of user's data collection and rigorous analysis by the Web servers as a regular private Web surfer. Web tracking is the practice by which websites and third-party companies collect information about users' online activity. The basis of tracking is the accurate identification of users—the user is detected and identified even when you're just passing through a random website that the user is not signed in to. The conventional solution to implement identification and tracking is saving web cookies to the user's browser. Apart from tracking, users cookies help with HTTP session management and personalization of the web content presented by Web servers.

The scraping user identification and tracking methodology may comprise the more traditional tracking methods such as by the IP addresses or the more advanced and complex method of fingerprinting.

The latter method is a more advanced technique developed to combat the inefficiencies of the traditional options and will be examined in further details separately in a section below. The former usually involves tracking and analyzing the IP address of the last-mile proxies used for servicing the request. A proxy server acts as an intermediary for requests from the user seeking resources from target servers. A user connects to the proxy server, requesting data. The proxy server evaluates the request and forwards the request to the actual target system or systems containing the corresponding data. After obtaining the data, the proxy server normally forwards the data to the original requestor, but other actions can also be performed by the proxy (e.g., return error message, etc.). Depending on the type of request, a proxy server may or may not have full visibility into the actual content fetched to the original requestor, e.g., in case of an encrypted Hypertext Transfer Protocol Secure (HTTPS) session, the proxy may serve as an intermediary, blindly forwarding the data without being aware of what is being forwarded.

The proxies can be divided into different types depending on what functions are provided or what servers are used. The proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi. When a user sends a request, the request goes to the proxy server first. The proxy server then makes the request on the user's behalf, collects the response from the web server, and forwards the web page data so that the user can access the page. When the proxy server forwards the requests, it can make changes to the data but yet provide the data requested. A proxy server changes the user's IP address, so the web server is not provided with the geographical location of the user. A proxy can encrypt the user's data so that the user's data becomes unreadable in transit. Also, a proxy server can block access to certain web pages, based on IP address, domain name, or the communication protocol parameters, such as the port requested.

Exit node proxies, or simply exit nodes, are gateways where the traffic hits the Internet. There can be several proxies used to perform a user's request, but the exit node proxy is the final proxy that contacts the target and forwards the information from the target to the user. There can be several proxies serving the user's request, forming a proxy chain, passing the request through each proxy, with the exit node being the last link in the chain that ultimately passes the request to the target.

A significant aspect of web users tracking methodology is registering a visitor's IP address and linking the user's logged web activity with said IP address. The registered IP address of the web user can also become an attribute taken into consideration and utilized by the web sites practicing fingerprinting the visiting users. While technically a reliable parameter, tracking or fingerprinting by IP address becomes less relevant for identifying a user and applying a personalized content policy due to the relaxed IP address utilization practices e.g. a single web surfer using multiple IP addresses across multiple devices, IP address hopping while changing locations and providers, as well as utilizing proxy servers as described above.

Another significant factor of enriching the browsing profile and mitigating the stateless nature of HTTP protocol is the notion of an HTTP cookie. An HTTP cookie (also called web cookie, Internet cookie, browser cookie, or simply cookie) is an arbitrary piece of data, usually chosen and first sent by the web server, and stored on the client computer by the web browser. The browser then sends the cookie back to the server with every request, introducing states (memory of previous events) into otherwise stateless HTTP transactions. Without cookies, each retrieval of a web page or component of a web page would be an isolated event, largely unrelated to all other page views made by the user on the website. Thus, cookies were designed to be a reliable mechanism for websites to remember stateful information (such as items added in the shopping cart in an online store) or to record the user's browsing activity (including clicking particular buttons, logging in, or recording which pages were visited in the past). They can also be used to remember pieces of information that the user previously entered into form fields, such as names, addresses, passwords, and payment card numbers.

Cookies perform essential functions in the modern web. Perhaps most importantly, authentication cookies are the most common method used by web servers to know whether the user is logged in or not, and which account they are logged in with. Without such a mechanism, the site would not know whether to send a page containing sensitive information, or require the user to authenticate themselves by logging in.

Tracking cookies, and especially third-party tracking cookies, are commonly used as ways to track users' web browsing habits by collecting individual cookies and compiling long-term records of individuals' browsing histories. This can also be done to some extent by using the IP address of the computer requesting the page or the referrer field of the HTTP request header, but cookies allow for greater precision. This can be demonstrated as follows:

If the user requests a page of the site, but the request contains no cookie, the server presumes that this is the first page visited by the user. So, the server creates a unique identifier (typically a string of random letters and numbers) and sends it as a cookie back to the browser together with the requested page.

From this point on, the cookie will automatically be sent by the browser to the server every time a new page from the site is requested. The server not only sends the page as usual but also stores the URL of the requested page, the date/time of the request, and the cookie in a log file. By analyzing this log file, it is then possible to find out which pages the user has visited, in what sequence, and for how long.

A relevant factor in web cookie processing is the fact that nowadays a large portion of web users is much more privacy oriented and conscious about accepting cookies. One of the consequences is that deleting cookies or restricting what is accepted became behavior, realistically expected from some visitors. Therefore cookies, as well as IP tracking, through still considered a baseline and widely used approaches, benefit greatly from combining them with other methods of tracking users and their behavior e.g. fingerprinting.

In light of the current public preferences in web browsing behavior and generally accepted privacy expectations it is no wonder that the traditional methods of tracking web surfers are less efficient. When compared with categorizing web visitors by their IP address, or the IP address of the proxy server used for reaching the Web server, or trying to uniquely identify and categorize a user by analyzing the cookies revealed by the user's browser, fingerprinting, as a relatively newer method of web users' profiling, comprises more sophisticated techniques for uniquely identifying the requesting user and dynamically adapting the Web server's response according to the guidelines for that particular visitor or a category of visitors. Several notions need to be clarified for further discussion—browsing profile, fingerprinting and fingerprinting surface.

The browsing profile is the sum of the configuration parameters that build up the overall context of running and executing browsing requests e.g. security and operational browser and system settings and preferences, browsing history, including the cookies previously accepted; the extensions, add-ons added.

Browser fingerprinting is a method of identifying, re-identifying and tracking visiting users and their web browsers by observing and registering the configuration settings or other observable characteristics they make visible to websites, otherwise defined as "the fingerprinting surface" of a user's browsing profile since the said characteristics belong to the browsing profile of a particular user i.e. they are part of the set of browser- and system-wide settings that make up the overall browsing "persona" of the user.

Consequently, a browsing fingerprint refers to information that is gathered about a computing device for identification purposes during the communication between a user's computing device and the target Web server across one or multiple sessions. In other words, any browser will pass highly specific data points to the connected website's servers while submitting the web request or during the consequent communication, for instance, such information as the operating system, language, plugins, fonts, hardware, to name but a few. Other significant attributes included are whether cookies are enabled, what platform the computing device is using, what type of browser (as well as its version) and computer is used, whether tracking cookies are blocked.

Websites can gather such data for a web visitor and use it for generating a unique personal fingerprint, i.e. an in-depth personal profile, for further customized processing of the corresponding requests e.g. target the user with personalized ads while presenting a particular page, or identify and block a scraping user.

An important aspect of the fingerprinting methodology is that a fingerprint can be derived, or re-generated multiple times in the exact same manner, provided the data used as the input stays the same. In some implementations a fingerprint is produced at one web site and registered in a shared database of the browsing fingerprints, possibly a dedicated 3rd party fingerprinting clearing house of sorts, for the purpose of deriving and identifying it again at a web site other than the one that generated the original fingerprint. Registering the web activity of the user at the web site, linking it with the fingerprint and making the fingerprint shared through a shared data source allows for the user to be uniquely identified across multiple web sites that are participants in a fingerprinting scheme, as well as present customized content to the user based on the previous user's activities.

Fingerprinting is used in collaboration with traditional methods of identification and tracking such as tracking by IP address and web cookies, linking the disparate data points together to create a unique user's profile enriched with details combined from multiple data sources.

Two primary vectors of fingerprinting methodology can be discerned—active and passive.

Active fingerprinting—comprises the methods requiring actively initiating communication by the target Web server to the browser where the initial web request originated. As an example, active fingerprinting techniques require the Web server to run JavaScript or other code on the local client to observe additional characteristics about the browser, user, device or other context parameters. Techniques for active fingerprinting can access numerous parameters of the originating computing device, browser application-wide and system-wide, whereas the methods used for obtaining the settings might include accessing the window size, enumerating fonts or plug-ins, evaluating performance characteristics, reading from device sensors, and rendering graphical patterns. Key to this distinction is that active fingerprinting takes place in a way that is potentially detectable on the client.

Passive fingerprinting techniques—merely require the fingerprinter to observe traffic originated from the target device. Passive client fingerprinting refers to the passive collection of attributes from a network-connecting client or server. Attributes may be collected from the transport, session, or application layer (e.g. TCP properties, Transport Layer Security (TLS) capabilities, or HTTP implementation characteristics). These attributes can be used to deduce information about the client, such as operating system (type and version), system up-time, or, in some cases, browser type. In addition, a client's passive fingerprint can be used to add uniqueness/entropy to the client's online identity, specifically when using a multi-layered device fingerprinting approach. Currently, there are three known and commonly used approaches to passively fingerprint web clients:

TCP/IP stack fingerprinting—a passive collection of configuration attributes from a remote device during standard layer 4 network communications. The combination of parameters may then be used to infer the remote machine's operating system (OS) (aka, OS fingerprinting), or incorporated into a device fingerprint.

Certain parameters within the TCP protocol definition are left up to the implementation. Different operating systems, and different versions of the same operating system, set different defaults for these values. By collecting and examining these values, one may differentiate among various operating systems, and implementations of TCP/IP. The TCP/IP fields that may vary include the following:

Initial packet size (16 bits)
Initial TTL (8 bits)
Window size (16 bits)
Max segment size (16 bits)
Window scaling value (8 bits)
"don't fragment" flag (1 bit)
"sackOK" flag (1 bit)
"nop" flag (1 bit)

These values may be combined to form a 67-bit signature, or fingerprint, for the target machine. Inspecting the Initial TTL and window size fields is often enough in order to successfully identify an operating system, which eases the task of performing manual OS fingerprinting.

TLS fingerprinting: provides security in the form of encryption to all manner of network connections from legitimate financial transactions, to private conversations, and malware calling home. The inability for an eavesdropper to analyze this encrypted traffic protects its users, whether they are legitimate or malicious. Those using TLS operate under the assumption that although an eavesdropper can easily observe the existence of their session, its source and destination IP addresses, that the content itself is secure and unreadable without access to cryptographic keying material at one or both ends of the connection. On the surface this holds true, barring any configuration flaws or exploitable vulnerabilities. However, using TLS Fingerprinting, it is easy to quickly and passively determine which client is being used, and then to apply this information from both the attacker and the defender perspectives.

Prior to entering initiating encrypted communications, TLS needs to create a handshake between the client and server which is then used to select the best mutually acceptable cryptographic ciphers, compression systems, hashing algorithms, etc. This is conducted in the clear, because the method of cryptography to use has yet to be determined. This is not problematic from the point of view of breaking cryptography; however, it does allow the opportunity to observe some behavior which is not masked from any eavesdropper by encryption.

A TLS connection will always begin with a client Hello packet which announces to the server end of the connection the capabilities of the client, presented in preference order. The server will send back a similar packet, a "server hello" describing the server capabilities in preference order. By comparing the two packets, the client and server can determine the optimal ciphersuites, compression algorithms, etc. to use per their preferences.

By capturing the elements of the client Hello packet which remain static from session to session for each client, it is possible to build a fingerprint to recognize a particular client on subsequent sessions. The fields captured are: TLS version, record TLS version, ciphersuites, compression options, and a list of extensions. Additionally, data is captured from three specific extensions (if available): signature algorithms, elliptic curves and elliptic curve point format. The use of this combined data is not only reliable in terms of remaining static for any particular client, but offers greater granularity than assessing ciphersuites alone, which has a substantially larger quantity of fingerprint collisions, or overlap.

While the HTTP/2 protocol does not mandate the use of TLS encryption, some implementations only support HTTP/2 over TLS, and currently no browser supports HTTP/2 over unencrypted connections. This means that passive TLS fingerprints can almost always be collected in conjunction with the HTTP/2 features to form a more accurate fingerprint.

HTTP Fingerprinting: While a browser and the corresponding Web server communicate employing HTTP/1.1, the initial request may contain multiple request headers and cookies, which when observed by the Web server may result in obtaining and registering the values for the following parameters:

User agent—browser and operating system;
Accept—type of media acceptable in the response;
Content encoding—compression methods supported by the browser;
Content language—the preferred language for the response;
Upgrade Insecure Requests—the user's preference for the encrypted and authenticated response;
Do Not Track—the user's tracking preference.

On the other hand, when communicating in HTTP/2, passive fingerprinting may involve examining the communication data for flows or messages in the protocol where different clients expose a consistent unique behavior that could be used for fingerprinting purposes, e.g., a consistent variation in the following protocol elements:

SETTINGS Frame is used for conveying configuration parameters that affect how endpoints communicate, such as preferences and constraints on peer behavior. The frame is sent from both client to server and server to client during the initial connection phase. The SETTINGS frame is also used to acknowledge the receipt of those parameters. Fingerprinting potential comes from the fact that different users differ in the SETTINGS parameters they choose to send, the order by which the SETTINGS parameters are sent, and the values set for the SETTINGS parameters.

The WINDOW_UPDATE frame is sent in order to notify the other endpoint of an increment in the window size. The fingerprinting potential comes from the fact that the connecting users may send the WINDOW_UPDATE frame after the SETTINGS frame, or another possible variation in the protocol end-points behavior may be that the increment value in the WINDOW_UPDATE frame consistently differs from user to user, as a result of different HTTP/2 client implementations.

The PRIORITY frame is sent in order to set a priority of any given stream within the HTTP/2 communication session. In real life scenarios a particular set of behavior traits may be observed and may be added to the overall user's fingerprint, e.g., in a HTTP/2 protocol implementation several PRIORITY frames may be sent right after the connection phase, all for streams that have been marked as "never to be opened with headers". The custom stream identifiers may be used as a part of the fingerprint.

The data collected due to the fingerprinting functionality of Web sites is concatenated into a long string and hashed in order to produce a fingerprint, i.e., a string of data that is easily indexed, searched for, and compared with other fingerprints.

Fingerprint Modification: The possible responses to an attempted fingerprinting activity are to consider the process part of the personalization activity i.e. ensuring the custom-tailored experience for the Web site visitors, or to look at it as a privacy violation and try to block it or avoid it altogether, For the latter one of the options is to modify the browsing profile, and as the intended consequence—the corresponding fingerprint, in order to subvert the whole technique. While technically feasible, there are some complexities which may present a difficulty, e.g., in TLS Fingerprinting to modify the fingerprint the Client Hello must be modified, which in turn means choosing to support, or not support, a number of ciphersuites and multiple other features. In turn, this could lower the security of the client or introduce the requirement to support previously unsupported options. Additionally, the fingerprinting technique works not only on the basis of what is disclosed by the client in the initial request, but the order in which the parameters are presented. Some libraries and frameworks abstract this level of detail away from the developer adding additional complexity into the process of modifying the fingerprint.

Fingerprint collisions: As with any fingerprinting technology there is scope for fingerprint collisions, that being where two different applications create the same fingerprint rendering them indistinguishable from each other. Such collisions may be caused by applications using a shared codebase or embedded technologies, such as webkits, inside the application. The primary mitigation approach would be to expand the scope of fingerprinting input data points collected and integrated into producing the fingerprint, thus ensuring the sufficient level of fingerprinting entropy.

SUMMARY

Companies with a web presence often develop a selective stance toward scraping parties, with reasons varying from the increase in capacity utilization to the effect data scraping may have on the business model of the data owner. There are techniques that websites use to react to scraping activities during the crawling stage, i.e., the stage of actually obtaining the data from the source by the scraping application initiating a connection with the web site and submitting the prepared request for a web page.

For example, a web site may try to identify the party submitting the request by a parameter that is part of the request, compare the identifying information obtained with the pre-defined list of guidelines for users or categories of users, and act upon the request accordingly, e.g., allow it through, block it to prevent further access, register the requesting party in an internal database, create a fingerprint for the requesting party and register it in a corresponding database, share the resultant information with other parties, or any combination thereof.

Another method of recognizing the behavior of interest may involve observing the rate of actions (or actions over time) registered from a particular IP address, since humans normally perform less actions than an automatized toolset would. Adapting to the customized policies web scrapers often choose to employ proxies and perform web scraping through multiple proxy IP addresses, thus masking the real IP address of the web scraper. This method both increases the speed of scraping and helps avoid impediments due to a single block-listed IP address since the scraping activity would be distributed across the IP addresses of multiple proxy servers.

Some methods of identifying unique users and acting upon their request according to some guidelines may be the fingerprinting technique described earlier, where a browsing profile fingerprinted and registered in a shared fingerprint database by one web site is re-created and re-identified at another web site using the same fingerprinting storage backend service. Therefore, browsing profiles can be traced across multiple web sites with both their positive and negative reputational footprint.

Employing multiple methods of identifying the requesting users and acting upon the request according to internal guidelines, web sites may choose to completely block the request which results in the desired data not obtained. The web site may choose to widen the scope and block the IP address of the requesting party, or to have the range of IP addresses, possibly even the subnet the requestor's IP address belongs to, blocked fully or partially.

Another policy applied to allegedly scraping parties may be to partially or temporarily reduce the visibility of the content to hinder further automated scraping. As a variant the data presented to an alleged scraping party may be pre-processed, or filtered and presented in a way to make it useless or to reduce its value.

Apart from blocking of the scraping attempt either for the duration of the session or for a longer period of time, a significant consequence of a scraping party being identified as such may be registration of the scraping entity in a specialized database in order to quickly identify the scraper during future communication with the web sites that consult the database. Among the attributes comprising the identity footprint may be parameters of the browsing profile, or the fingerprint derived from the features of the browsing profile. With a significant degree of certainty the registration of a user in a fingerprint database and successful linking of the user with an existing fingerprint means that the web server may process the request in a customized fashion, potentially custom-tailoring the results by personalization attempt for a regular web surfer, and either skewing or obfuscating the data for the web scraper. Moreover, the once registered browsing profile or the corresponding fingerprint may be marked with a negative reputational standing, with said standing transparently influencing the future web activities of the browsing or scraping user.

For web scraping to mitigate negative policy factors, to prevent blocks from the desired data sources and to collect public data successfully, the scraping applications need to employ methods of adapting to the challenges presented here, as well as multiple others. The methods, among other benefits, may increase the probability of positive evaluation by the web sites by portraying organic behavior and traffic during data collection sessions, constructing well developed browsing personas that will have a high degree of human-like attributes.

The browsing persona presented to web sites is in fact the composite construct of the browsing profile of the user combined with the browsing session-specific details, possibly enriching the user's overall presence with the traces of the current session's actions. Since browsing profile is in turn a compound of well-defined system and browser parameters and their values, it can be artificially constructed.

In one aspect, the embodiments detailed here disclose a method of optimizing the parameters of a user's scraping request at the Service Provider's side by enriching the request with the browsing profile parameters adjusted to the specifics of the requested data and target. The optimized browsing profile may have multiple parameters and their values adjusted as compared to the original request. The browsing profiles utilized during the scraping activities may be, but are not limited to:

artificially constructed and populated with a number of static attributes according to a pre-established Parameters compatibility ruleset (see FIG. 2A);

populated with dynamic attributes according to a pre-established Parameters compatibility ruleset, wherein the values of the dynamic parameters will be left empty (see FIG. 2B);

containing non-functional parameters related to profile management as part of the profile;

selected and utilized for enriching the scraping request;

having dynamic parameters (see FIG. 2B) updated with the so-called input data, i.e. data becoming present during the regular scraping sessions, initiated by the users of the platform, or the synthetic scraping sessions triggered and executed by the components of the platform and the so-called feedback data, i.e. the data obtained through the analysis of the data aggregated from the results of multiple scraping sessions;

saved back to the corresponding database in their updated form at any pre enrichment or adjustment steps;

have their quality tested, verified and maintained by utilizing the profiles with synthetic requests;

have certain browsing profile parameter-value pairs tested with a throw-away browsing profiles In one aspect, the embodiments detailed herein extend the methods of task implementation, including targeting one step of a web scraping process—a step of a customer submitting a request for the content to be fetched. In one aspect, the embodiments detailed herein allow combining the request with a browsing profile appropriate for the scraping target, submitting said request to the scraping application and consequently receiving data that is specific for the request, also avoiding blocking or response obfuscation by the targeted web sites. The data fetching system and method of the web scraping remains unaltered. This includes the same general web crawler and scraping task flow of accepting the request from the user, attempting to retrieve the requested data, and delivering data to the user.

In one aspect, the proposed solution provides an effective way to ensure the scraping requests obtain the desired data while avoiding mitigating the customized content presentation policies at the targeted web sites, if such policies reduce the quality of the data obtained, by establishing the platform for first:

generating a catalogue containing the browsing profiles populated with baseline static parameters, followed by enriching the browsing profiles with dynamic parameters correlated to data points defining human-like organic browsing artefacts;

further supporting the scraping engine by selective provisioning said browsing profiles in an exclusive fashion for augmenting scraping requests, updating the utilized browsing profiles with the relevant web session artefacts generated and obtained during the organic scraping activities or by synthetic enhancement activities.

BRIEF DESCRIPTION OF DRAWINGS

The features and advantages of the example embodiments described herein will become apparent to those skilled in the art to which this disclosure relates upon reading the following description, with reference to the accompanying drawings, in which.

DETAILED DESCRIPTION

Figure 1:
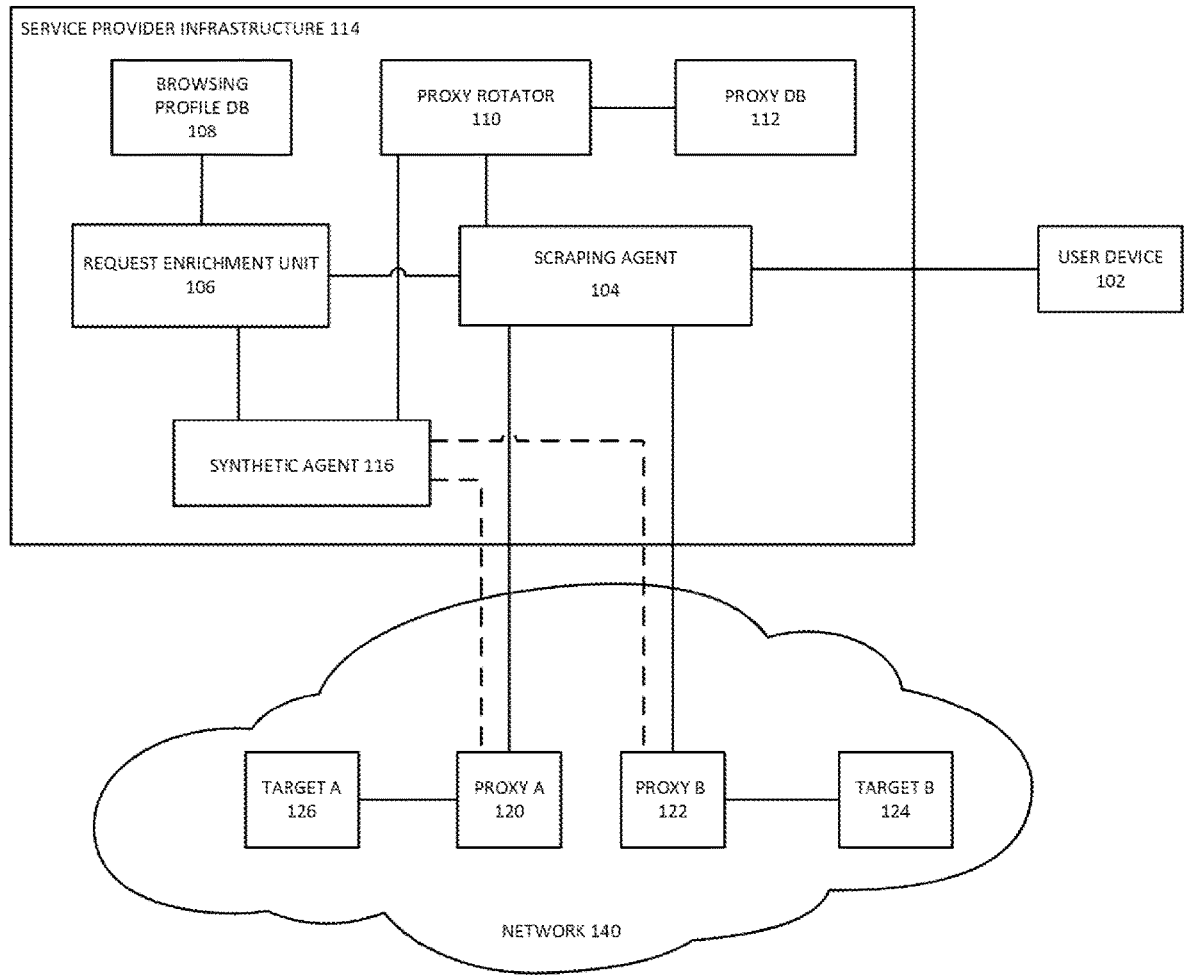
FIG. 1 is an exemplary component diagram that shows the overall architecture of components and context of at least one aspect of solution functions.

Some general terminology descriptions may be helpful and are included herein for convenience and are intended to be interpreted in the broadest possible interpretation. Elements that are not imperatively defined in the description should have the meaning as would be understood by a person skilled in the art. Elements 104 through 116 identify parts of the Service Provider Infrastructure, with elements 102, 120-126 and 140 showing external components or systems.

User Device 102—can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for making a scraping request.

Scraping Agent 104—is a component of the Service Provider Infrastructure 114 that is responsible for containing and running the scraping applications executing the scraping requests originating from the commercial users, as well as accepting said requests from the users.

One role of this element is to enrich a scraping request with additional parameters and their values to ensure better data extraction results, whereas the additional parameters and their values are selected from the structured construct of a Browsing profile, obtained from the Request Enrichment Unit 106 for the individual request or a series of requests.

One aspect of the functionality contained within Scraping Agent 104 is the selection of an appropriate scraping application for executing a request against a particular target, or a category of targets. The decision to employ a particular scraping application for a request may be based on the checking the URL of the request, i.e., the hostname or the domain of the target contained therein, against a pre-defined ruleset of matching particular hosts or domains with a scraping software best aligned with the policies and capabilities of the target.

Another aspect of Scraping Agent 104's functionality is to select a proxy for executing the request, locally or from a dedicated proxy management element such as Proxy Rotator 110, whereas the parameters of the proxy server selected are aligned with the requirements of the request, e.g., the geolocation of the proxy may have to coincide with the requested Target's location. In an alternative embodiment Scraping Agent 104 may be a 3rd party component not located within the Service Provider Infrastructure 114 but communicably connected to the Request Enrichment Unit 106.

Request Enrichment Unit 106—is an advanced web requests and Browsing profiles analysis tool that is a part of the service provider infrastructure and accepts requests from the Scraping Agent 104 for examination and analysis and further identifying of the parameters that are relevant for selecting the Browsing profile, selecting a Browsing profile aligned with the request parameters and returning the Browsing profile to the Scraping Agent 104. Using an analysis algorithm, the Request Enrichment Unit 106 can identify and select the Browsing profile 260 containing the parameters and values most beneficial for the request and pass the Browsing profile selected to the Scraping Agent 104 for further adjusting the request to perform scraping of the Target 124-126. As an example, the Location attribute or attributes (Country, City and Timezone) within the Browsing profile may be required to be aligned with the location requirements contained within the request. The metadata of both the request and the response is always visible to the Scraping Agent 104 and is passed over to Request Enrichment Unit 106, e.g. URL and HTTP headers. This functionality is necessary for the Request Enrichment Unit 106 to correctly analyze the request parameters and select the appropriate Browsing Profile, as well as update the corresponding parameters within the Browsing profile utilized.

Part of the request parameter analysis at the Request Enrichment Unit 106 is the scrutiny of scraping software capabilities required for executing the request e.g. TLS and HTTP/2 capabilities, and identifying the Browsing profiles containing the parameters and corresponding values for supporting said capabilities.

Figure 2A:
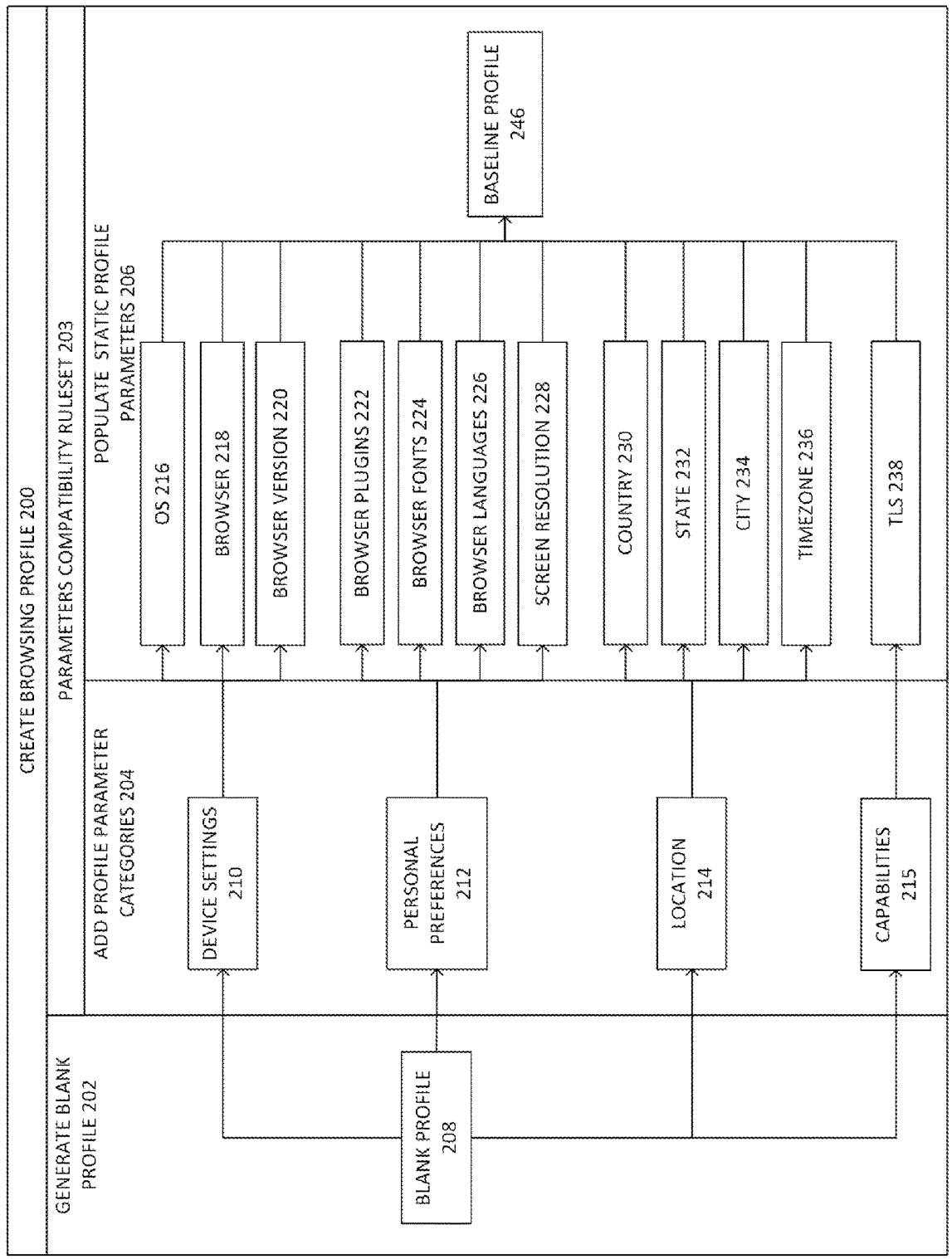
FIG. 2A demonstrates bulk creation of blank browsing profiles populated with a minimum set of static parameters.
Figure 2B:
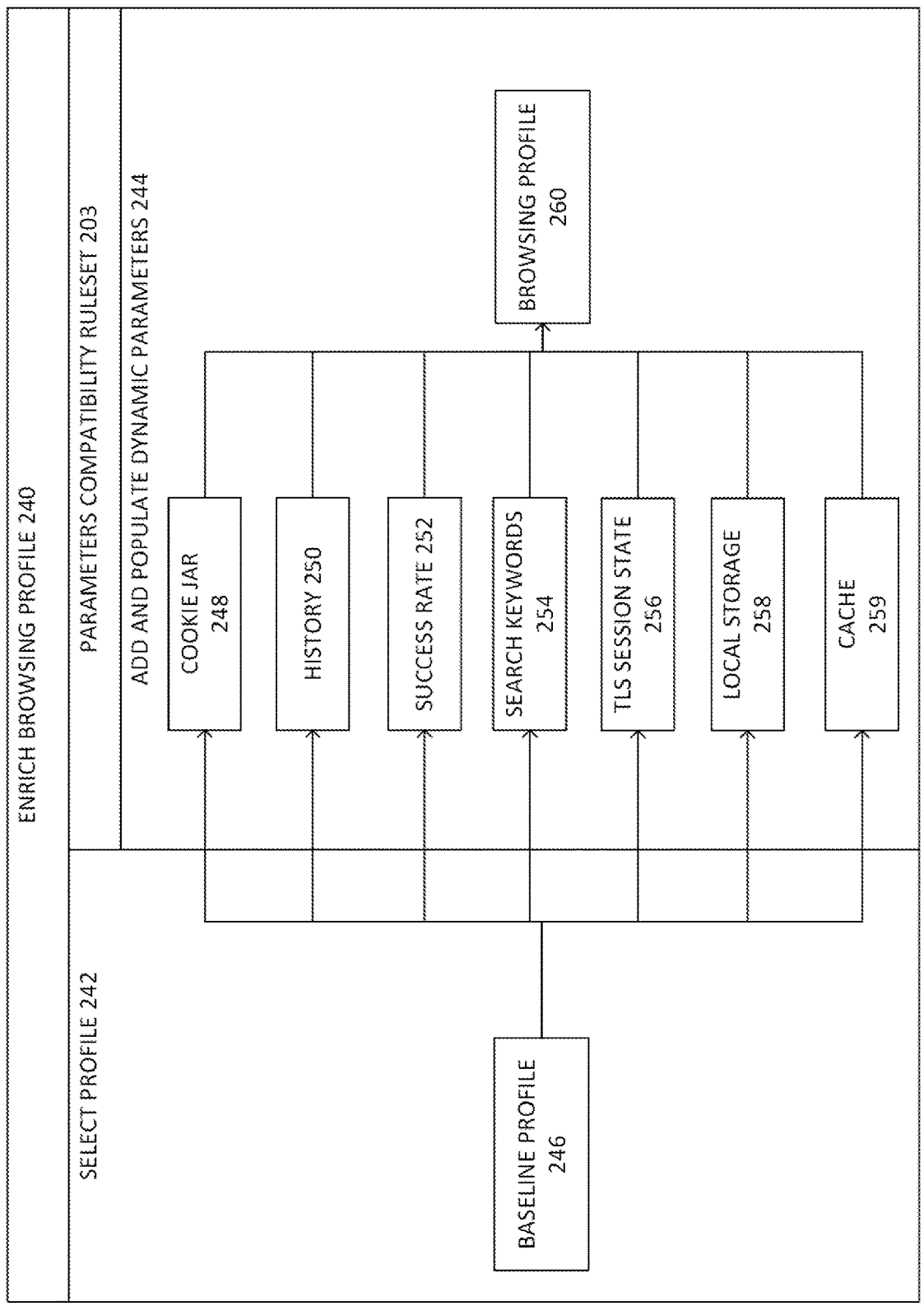
FIG. 2B depicts a sequence diagram in a continuation of FIG. 2A and provides a detailed description of enriching the basic browsing profiles with dynamic parameters.

An exemplary part of the Request Enrichment Unit 106's functionality is the initial population of blank Browsing profiles created in the Browsing Profile DB 108 with relevant parameters and their values. As shown in FIGS. 2A and 2B, the selection of parameters and their values for the population is executed according to the logic defined within the Parameters compatibility ruleset 203. Parameters compatibility ruleset 203 contains both the input data for population in the format of a catalogue of possible Browsing profile parameters and their viable values and the rules by which their combination must abide. The rules contained therein may define dependencies between parameters or their categories.

In some embodiments, Parameters compatibility ruleset 203 may be the data source for Machine Learning models or statistical analysis algorithms that perform an advanced parameter compatibility analysis and produce long-term guidelines as to what combinations of personalization parameters and their values play best for a particular Target or a category of targets.

In one example, the combination of OS (216)-Browser (218)-Browser version (220) have a direct influence of the values of parameters defining TLS capabilities, browser platform and vendor, webgl support etc., therefore these parameters are populated using the pre-defined ruleset 203. However, machine learning models or statistical analysis algorithms may be used for selecting OS (216) and Location (214) parameters combinations since some vendors or versions of operating system may have an affinity to a particular region, e.g., MacOS is more popular in France than in India.

Another aspect of the Request Enrichment Unit 106 is to initiate synthetic scraping requests in order to test Browsing profiles and enhance their dynamic parameters with the artefacts of the scraping session, e.g., add new cookies, update browsing history as well as success and failures at particular web sites, register keywords used for searches within the browsing session. Synthetic scraping requests are executed through Synthetic Agent 116. Possible triggers for launching synthetic enrichment activity may be Browsing profile parameter thresholds, e.g.:

multiple repeating failures at a particular target or a category of targets, resulting in a failure counter value deemed as requiring mitigation activities;

the profile has been inactive too long and risks becoming outdated;

a profile is freshly created and needs enrichment before actual utilization with regular scraping requests.

Browsing Profile DB 108—is a structured database (DB) that is contained within a data storage device, e.g., computer disk or computer memory. The specifics of the implementation of the Browsing Profile DB 108 are of little to no relevance to the functionality provided, be it an application of horizontal or vertical partitioning; hardware-based clustering; application-level distributed model, with any of these options operating within a single hardware device or in a distributed manner, whereas the data may be spread across multiple schema instances, servers, data centers, countries or continents for the purpose of spreading the load, improving performance, ensuring resilience of the platform or other objectives. The Browsing Profile DB 108 is populated with data from the Request Enrichment Unit 106 and contains information about all the Browsing Profiles developed and procured by the Service Provider for the purpose of enchanting scraping requests.

Proxy Rotator 110—is a part of the Service Provider Infrastructure coupled with separate external components implementing specific assisting functionalities and is responsible for proxy control, rotation, maintenance, collecting statistical data, and reporting.

Proxy DB 112—is a structured database (DB) that is contained within a data storage device, e.g., computer disk or computer memory. The specifics of the implementation of the Proxy DB are of no relevance to the functionality provided, be it an application of horizontal or vertical partitioning; hardware-based clustering; application-level distributed model, with any of these options operating within a single hardware device or in a distributed manner, whereas the data may be spread across multiple schema instances, servers, data centers, countries or continents for the purpose of spreading the load, improving performance, ensuring resilience of the platform or other objectives. The Proxy DB is populated with data from the proxy rotator and contains information about all the proxies available to the service provider.

Service Provider Infrastructure 114—the combination of the elements comprising the platform supporting managing the variety of browsing profiles for enriching scraping requests submitted by customers and executing said scraping requests in an efficient manner.

Synthetic Agent 116 is a component of the Service Provider Infrastructure 114 that is responsible for containing and running the scraping application executing the synthetic scraping requests for the purpose of testing browsing profiles, collecting and registering the browsing session artefacts that are appropriate for updating the dynamic parameters of the browsing profile utilized for the corresponding session and updating said profile parameters, e.g., list of cookies, browsing history, success and failures at particular web sites, as well as keywords used for searches within the browsing session. Synthetic Agent 116 may be a dedicated component of the solution, co-located with the Scraping Agent 104 or implemented as a distinct element, may also have all its functionality executed by the Scraping Agent 104.

Proxy 120 and 122 indicate an exemplary multitude of proxy servers (computer systems or applications) opened for the client connection, that act as an intermediary for requests from clients seeking resources from other servers. A client connects to the proxy server, requesting a service, such as a file, a connection, a web page, or other resources available from a different server. The proxy server evaluates the request for content and forwards the request through to the actual target resource, or resources, containing the actual content. After obtaining the content, the proxy server normally forwards the content to the original requestor, but other actions by the proxy (e.g. return error message) can also be performed. In one aspect, in at least one of the embodiments detailed herein, a proxy server may not have full visibility into the actual content fetched for the original requestor, e.g., in case of an encrypted HTTPS session, if the proxy is not the decrypting the end-point, the proxy serves as an intermediary blindly forwarding the data without being aware of what is being forwarded. However, the metadata of the response is always visible to the Service Provider, e.g. HTTP headers. This functionality is necessary for the proxy to correctly forward the data obtained to the correct requesting party—the end user or the mediating proxy device. Proxy 120 and Proxy 122 are presented here as a simple indication that there can be more than one proxy server held at the Service Provides Infrastructure 114. The embodiments should not be limited to the proxies that belong to the Service Provider. The proxies can be owned and managed by a third party, however, the Service Provider always has access and can use such proxies.

Target 124 and 126 is an exemplary multitude of web servers serving the content accessible through HTTP/HTTPS protocols. The two targets, Target 124 and Target 126, are presented here as a simple indication that there can be more than one target, but it should not be understood in any way as limiting the scope of the disclosure. There can be an unlimited number of Targets in the Network.

Network 140 is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Browsing Profile 260 is a compound of well-defined system and browser parameters, viable for enriching a scraping request, comprising:

Static parameters—includes a set of basic Browsing profile parameters that are added and populated during the initial Browsing profile generation and are rarely changed through the lifecycle of the browsing profile. In the described exemplary system Static parameters may be organized in categories, e.g., Device settings, Browser personal preferences, Location details and Capabilities. The potential parameters of a Browsing profile and their possible values are stored in Parameters compatibility ruleset 203. Extending the list of parameters and updating their values within the ruleset may be triggered by the necessity to incorporate newly appearing options e.g. a new browser on the market, a major update to an existing browser or an operating system etc.

Dynamic parameters—includes a set of advanced Browsing profiles parameters that are added and populated after the initial Browsing profile generation with the data derived from the responses obtained within the context of the scraping sessions the profiles are utilized for. The parameters in this category are the ones that may be constantly adjusted, updated and generally modified through the lifecycle of the Browsing profile. Within some Dynamic parameters there may be information that supports the Browsing profile management, e.g., success/failure ratio with a particular web site may trigger additional profile enrichment activities such as synthetic scraping requests executed with the Browsing profile in question attached.

The plurality of exemplary methods used to create, utilize and update the user profile comprise the system depicted in FIG. 1, which shows an exemplary component diagram of the overall architecture of the disclosed components and context of at least one aspect of solution functions. In at least one aspect, the present embodiments show communications between the User Device 102 and the Service Provider Infrastructure 114 to reach any Target 124-126 on the Network 140. The Service Provider Infrastructure 114 comprises the Request Enrichment Unit 106, Browsing Profile DB 108, Scraping Agent 104, Proxy Rotator 110, Proxy DB 112, and Synthetic Agent 116. FIG. 1 shows that the User Device 102 and Proxy servers 120-122 are not a part of the Service Provider Infrastructure 114. The User Device 102 can be any device that can connect to a Service Provider Infrastructure through any network, but in most cases it does so through the Internet. Such a device can be a computer, a mobile phone, a tablet, or any other electronic device. FIG.

1 shows that Targets 124 and 126 are outside of the Service Provider Infrastructure 114 and are based in any Network 140. In most cases, the Network 140 is the Internet. The Request Enrichment Unit 106 allows the system to modify the scraping request parameters with a set of parameters that together render a Browsing profile. Organic scraping requests originating at the real user's computing device are processed by the Scraping Agent 104, whereas the Synthetic Agent 116 executes the scraping requests that have the purpose of testing and updating the browsing profiles contained within the Browsing profiles DB 108.

The process 200 of the initial bulk generation of blank Browsing profiles is depicted in FIG. 2A, with the generation algorithm first creating blank profiles at step 202, where the generated profiles are next expanded with the exemplary categories of Static parameters at step 204 while at step 206 each category has its parameters added to the Browsing Profile record and populated with the values from the list of compatible values according to the predefined Parameters compatibility ruleset 203. As an example, two methods can be applied to get a better variety of profiles:

Check statistics about most common devices used in world web browsing;

Check what profiles are already created in profiles DB to avoid imbalanced profile distribution;

The result of process 200 is the baseline Static Browsing profile 246 comprising the parameters as follows in an exemplary model.

The category of Device Settings 210 comprising the parameters of

Operating system 216

Browser 218 and

Browser version 220, where the parameters of the category are sufficient to populate OS, browser and browser version parameters, because Request Enrichment Unit 106 will have enough information to choose HTTP headers, User-Agent or additional static browser parameters, like webgl vendor, platform etc.

Personal preferences 212 comprising the parameters of

Browser plugins 222

Browser fonts 224

Browser languages 226

Screen resolution 228

The parameters within this category may be subject to active fingerprinting. They are not static for browsers and are unique for any individual. It is important to notice relationships between parameters, e.g., not all plugins can be installed in a selected browser or some fonts may not be used in a specific browser version.

Location settings 214 with the parameter of

Country 230

State 232

City 234

Timezone 236

The parameters in this category are instrumental for the Scraping Agent 104 to establish the corresponding time zone during a scraping session within the configuration of the scraping software, as well as choose an appropriate proxy server with the IP address belonging to the correct location.

Capabilities settings 215 comprising the parameters of

TLS capabilities 238, e.g. TLS Version, Accepted Ciphers, List of Extensions, Elliptic Curves, and Elliptic Curve Formats.

The parameters in this category may be part of the "fingerprinting surface" of a user since multiple TLS implementations may widely differ in what functionalities they possess, how they are negotiated, and in what order they are presented.

The TLS capabilities record contains all the parameters related to TLS in any suitable form—a concatenated string, a dictionary or a list of dictionaries, as demonstrated by FIG. 2A.

As demonstrated by the disclosed format details potential parameters within Parameters compatibility ruleset and their viable values may be stored as, but not limited to: separate records, concatenated value strings in a single database field, a dictionary or a list of dictionaries.

Throughout the second stage of Browsing profile generation at process 240, the Browsing profile 246 is subjected to enrichment with the Dynamic parameters and their values:

Cookie jar—includes cookies from HTTP requests. Possible storing format may be the standard HTTP cookie jar format;

History—this parameter should store browsing history data. Possible store format: list of dictionaries where each dictionary contains three keys: host, visit_count and last_visit. Example:

[{"host": "www.example.com", "visit_count": 10, "last_visit": "2020-05-12"},]

Success rate—this parameter should store data about profile performance with different hosts. Possible store format: list of dictionaries where each dictionary contains three keys: host, success, fail. Example:

[{"host": "www.example.com", "success": 10, "fail": 1}]

Each time a profile performs successfully, the "success" key should be incremented. The same rule applies to the situations of failed requests, i.e., the key "fail" should be updated accordingly. History and Success rate parameters could be merged in one data structure and their format here is for purely demonstrational purposes and explaining the functionality.

The traditional classification of responses as successful or failing has been based on HTTP response code within the Target's reply, where code 2xx means a success, 3xx is a temporary postponing of the final reply since it redirects the request to another address, and 4xx and 5xx error codes are considered failures. However, it is not always possible to classify a response as a blocked request using status code and response size. In many cases, a blocked request can obtain 200 status code and data block that is big enough to resemble a legitimate web page. One exemplary method for detecting a block is to use a Machine Learning model that can predict if it is a block or good content using parsed text string from an HTML response.

Search keywords—this parameter should store keywords that were used for performing a search within various websites while performing the scraping session. This would allow users to have profiles with preferences registered for particular points of interest. Possible storing format: list. Example:

["smartphone", "tv model", "laptop"]

The example above illustrates that the web survey behind this particular profile is interested in particular electronic products. Therefore, in some cases, this profile may be served with apple product ads by some websites.

TLS session state—includes session data comprising session keys and Session Ticket, elements that are produced as part of an established successful TLS session and are instrumental in re-establishing TLS session with a known host.

Local storage—is storage that allows JavaScript sites and apps to store and access data right in the browser. Storage can store data but not entire pages and has no expiration date. This storage may be highly relevant to profile identity, because some webpages may ask to access previously saved data. One of the possible formats may be sql database.

Cache—includes temporary data that is saved by a browser locally. The data may be a webpage, or part of a web page, that does not change from visit to visit. Multiple types of resources can be cached, e.g., HTML pages, JS scripts, CSS styles, and images. Keeping a local copy of an unchanging web data provides for reusing the local resources, saving on costs, and performing faster. Expiration date for the data cached locally is set by the webpage the content originated from. The presence of a web cache can be relevant to profile identity, because websites can see if the profile exhibits a natural behavior by not asking for the same resources within the web site repeatedly, which indicates organic behavior.

The final output of the process shown in step 240 Enrich Browsing profile, is the Browsing profile 260 that is prepared for being utilized during a scraping session. Process 240 is initially populating the profile with parameters and their values according to the Parameters compatibility ruleset 203, and consequently updating the values with the results of regular scraping sessions as well as synthetic testing scraping sessions.

Significant aspects of the functional purpose of the Parameters compatibility ruleset 203 are:

providing the rules for populating the Browsing profile parameters and their values and ensuring their compatibility within the same Browsing profile;

providing the data for population of the Browsing profile with parameters and their values;

providing the rules for selecting a Browsing profile most aligned with the request.

As an alternative way to support the selection of the scraping application for a particular request, Parameters compatibility ruleset 203 may contain the rules for matching a particular target, or category of targets, to a scraping application most aligned with the specifics of the target.

Figure 3:
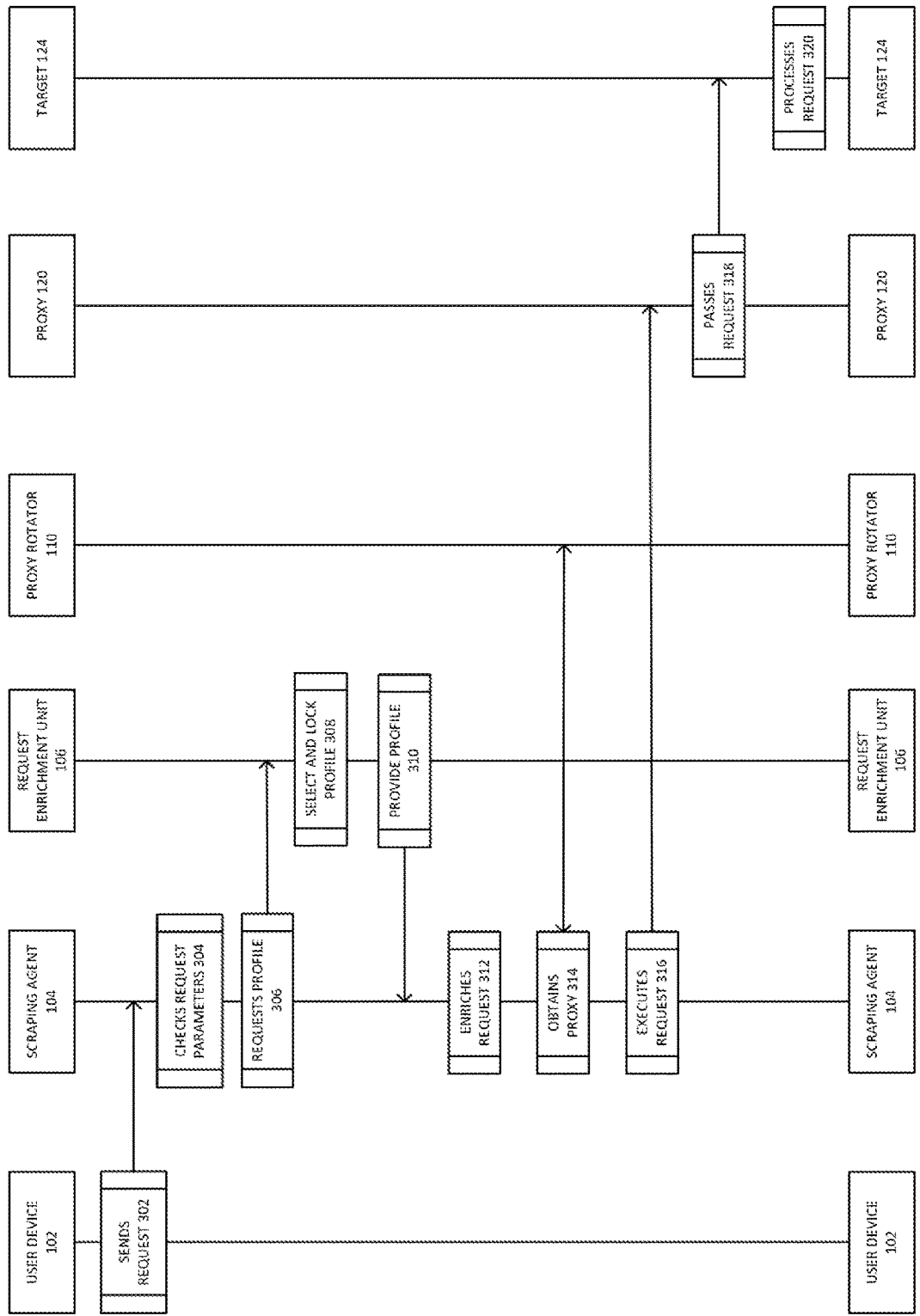
FIG. 3A is an exemplary sequence diagram describing the successful execution of a scraping request while enriching the request with a browsing profile selected from the catalogue of browsing profiles and updating the profile utilized with the scraping session artefacts.
FIG. 3B is a sequence diagram in a continuation of FIG. 3A.
Figure 3:
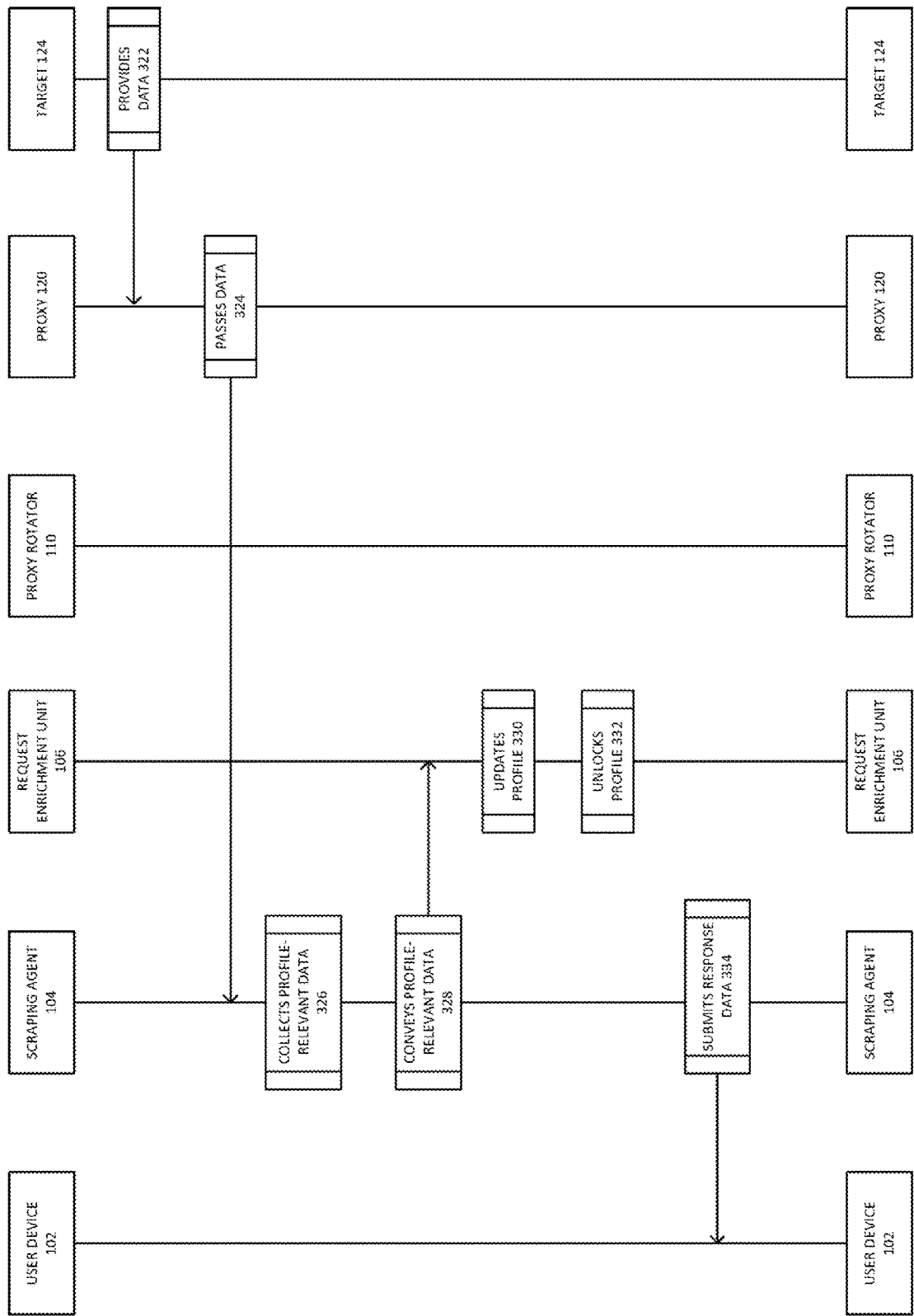

FIG. 3A is a sequence diagram, describing the route of a scraping request. FIG. 3B is the continuation flow of the scraping request. The flow starts with a User device submitting a scraping request at step 302, with the Scraping Agent 104 as the entry point to the Service provider, whereas upon the initial analysis of the request at step 304, a Browsing profile is requested by the Scraping Agent 104 from the Request Enrichment Unit 106 according to the parameters of the scraping request. At step 308 the appropriate Browsing profile is selected from the Browsing Profile DB 108, its database record is marked as locked to avoid another scraping session obtaining the same Browsing profile, while the profile is provided to the Scraping Agent 104 at step 310. Within the next step 312 the original request is combined with the Browsing profile obtained, both Static and Dynamic parameters, and further executed through the Proxy 120 obtained from the Proxy Rotator 110 during the step 314. The Proxy server 120 in turn submits the request (step 320) to the Target 124.

Steps 322 and 324 follow with the response from the Target 124 returned to the Scraping Agent 104 where the response is dissected and at the step 326 has the data relevant for updating the utilized Browsing profile identified and extracted. The data is conveyed back to the Request Enrichment Unit 106 (step 328) for updating the dynamic parameters of the profile within the Browsing profile database (for the purpose of brevity concealed within the Request Enrichment Unit 106 element) at step 330 and the corresponding database record is unlocked at step 332, whereas the response data relevant for the requesting user is forwarded back to the user at step 334.

Figure 4:
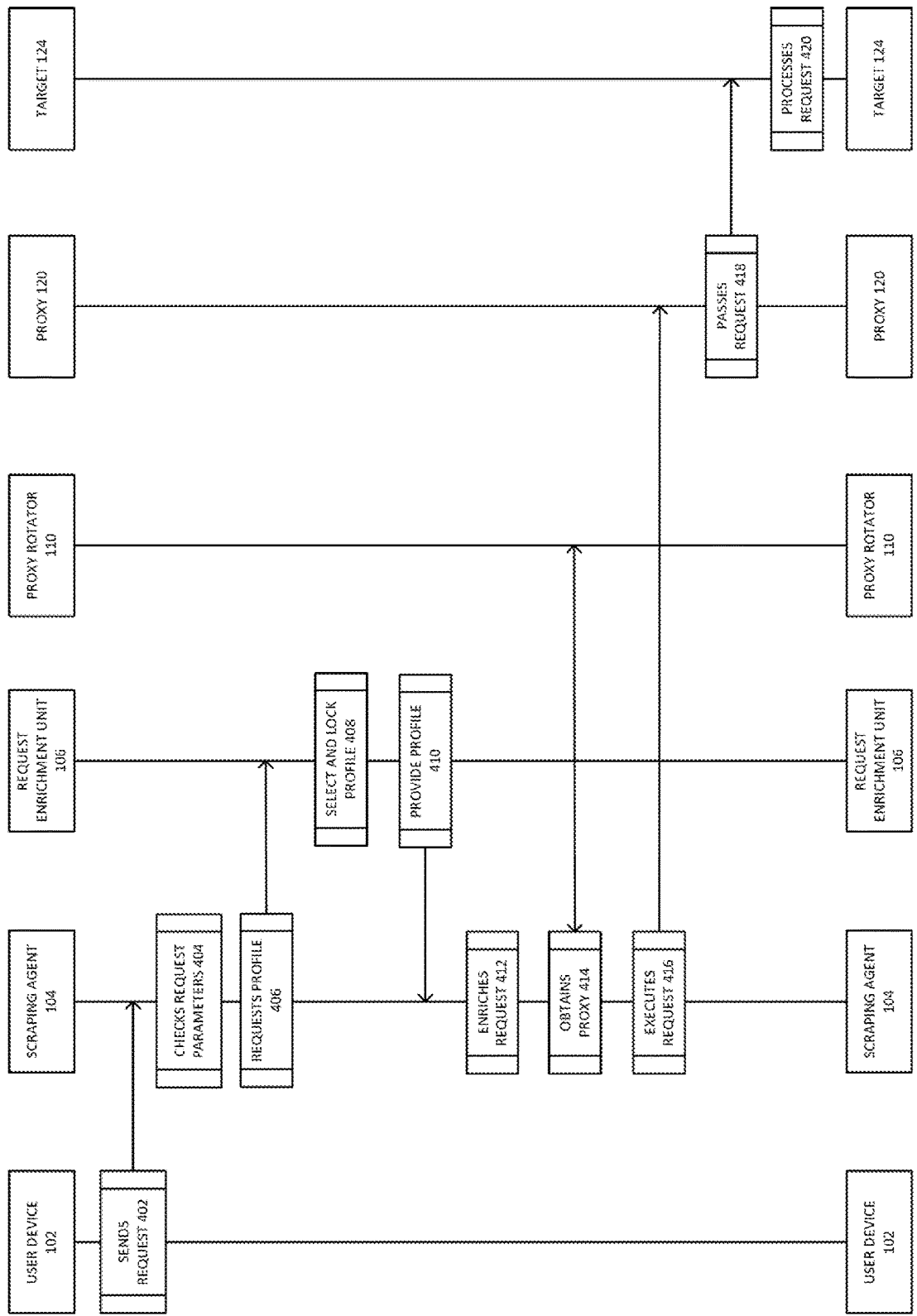
FIG. 4A is an exemplary sequence diagram describing a failed execution of a scraping request while enriching the request with a browsing profile selected from the catalogue of browsing profiles and updating the profile utilized with the scraping session artefacts, while providing and executing the scraping request with an alternative browsing profile.
FIG. 4B is a sequence diagram in a continuation of FIG. 4A.
Figure 4:
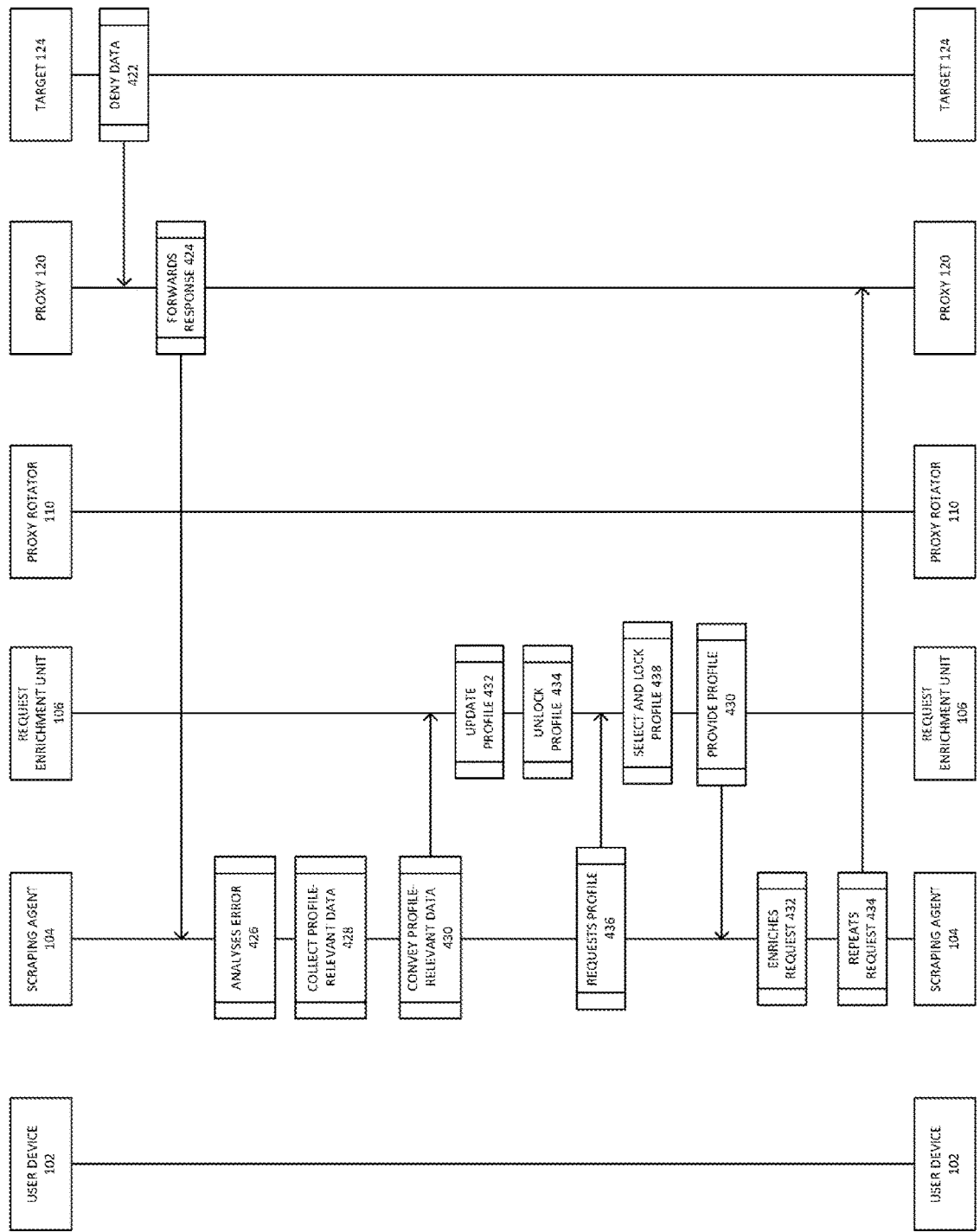

FIGS. 4A and 4B describe a flow closely similar to that of FIGS. 3A-3B with differentiating steps starting with step 422 where the Target 124 denies providing the regular response, instead either blocking the request or obfuscating it behind a CAPTCHA or similar methods. This forking of the flow results in step 426 of Scraping Agent 104 examining the error report forwarded by the proxy 120 at step 424. The results of the analysis allow the data relevant for updating the Browsing profile to utilize to be collected at step 428 and further conveyed to the Request Enrichment Unit 106 at step 430, with the actual profile updated with the data collected at step 432 and the record unlocked at step 434. An alternative Browsing profile is requested by the Scraping Agent 104 at step 436, with the Request Enrichment Unit 106 selecting an appropriate profile record, simultaneously locking it, at step 438, and passing it to the Scraping Agent 104 (step 430), where the scraping request is enriched with the new Browsing profile (step 432) and submitted to the Target 124 through Proxy 120 at step 434.

Figure 5A:
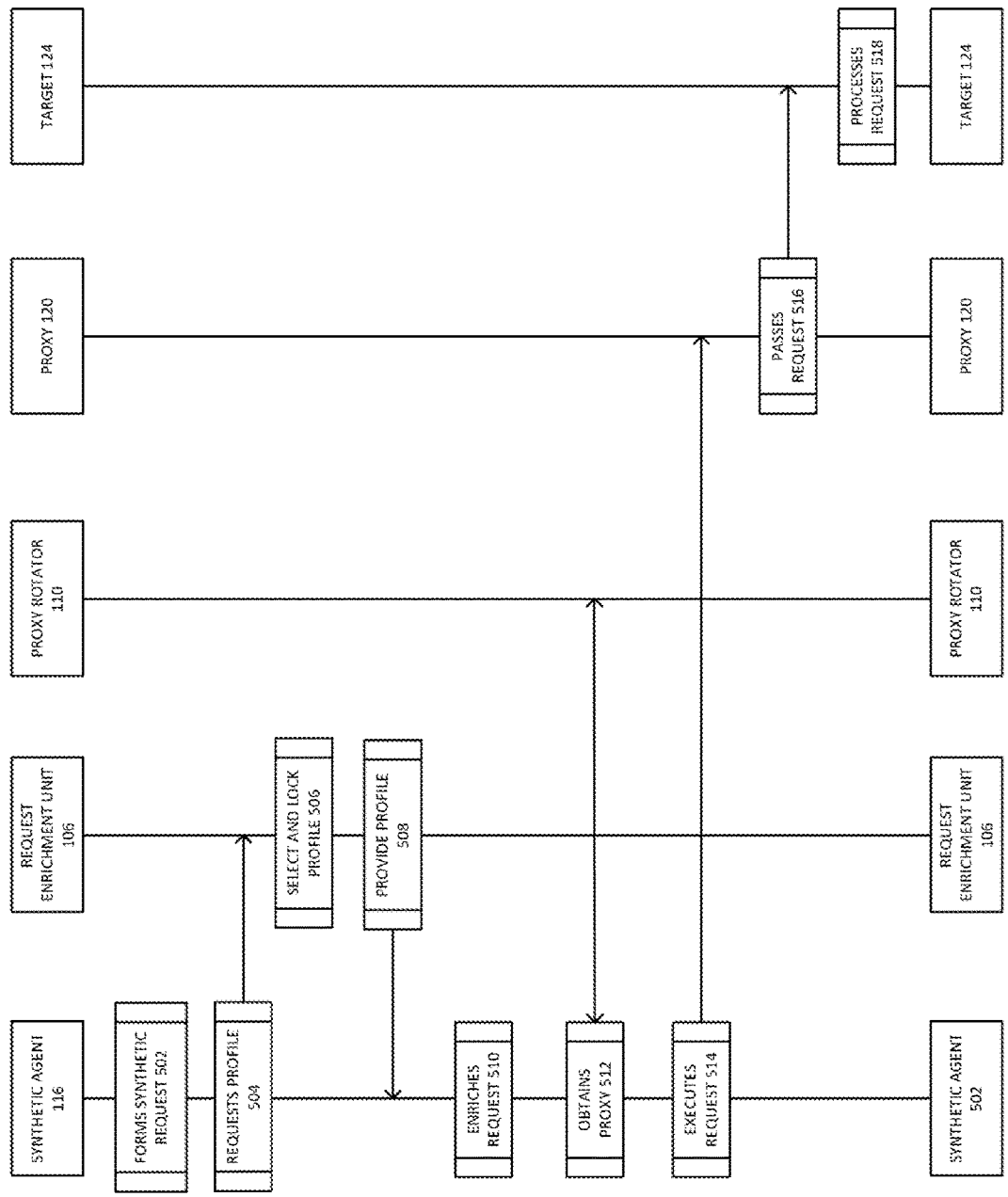
FIG. 5A is an exemplary sequence diagram describing the successful execution of a synthetic scraping request while enriching the request with a browsing profile selected from the catalogue of browsing profiles and updating the profile utilized with the synthetic scraping session artefacts.
Figure 5B:
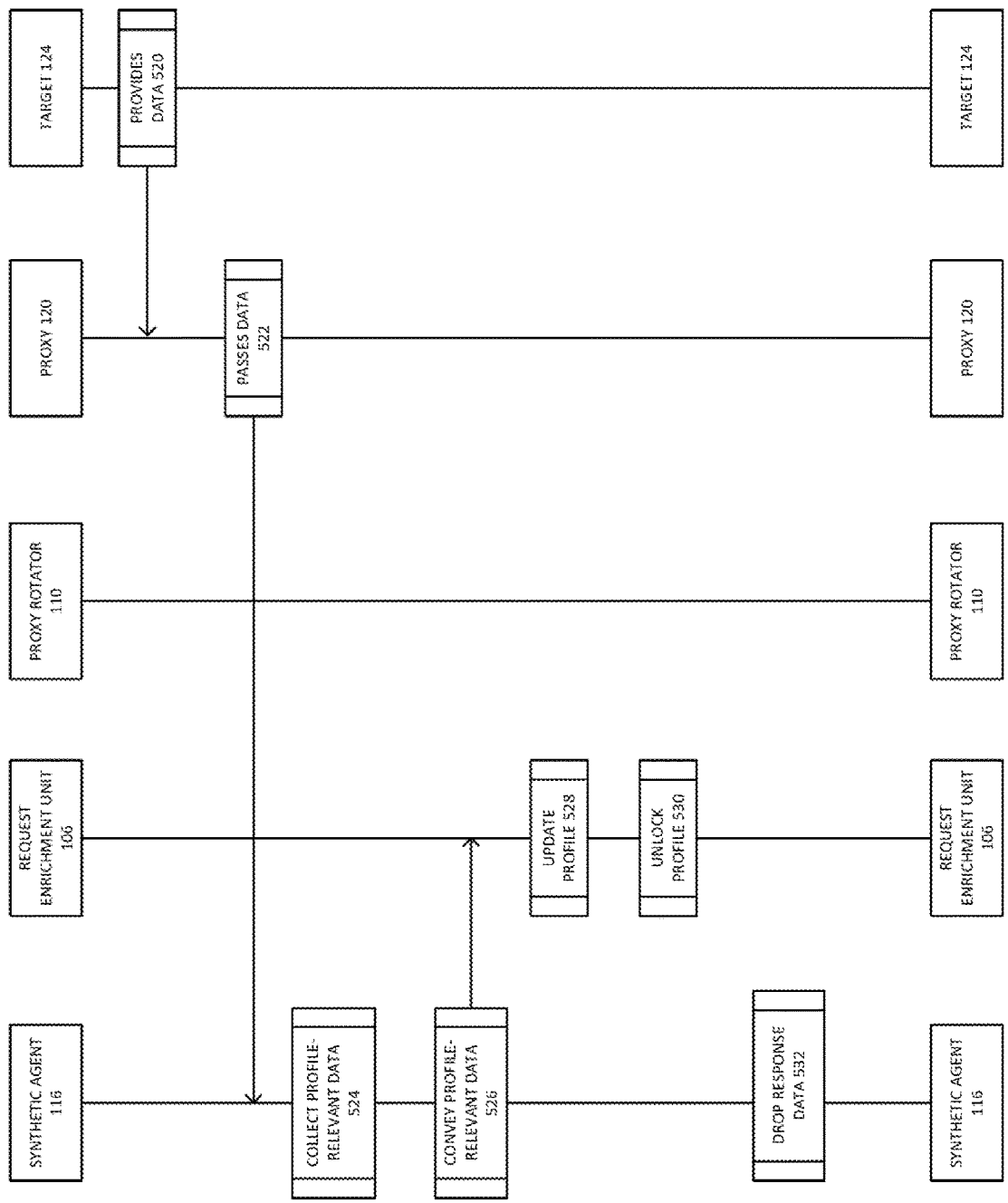
FIG. 5B is a sequence diagram in a continuation of FIG. 5A.

FIGS. 5A and 5B describe a flow closely similar to that of 3A-3B with the only difference of the scraping request being generated within the Request Enrichment Unit 106 for the sole purpose of testing browsing profiles, collecting and registering the browsing session artefacts that are appropriate for updating the dynamic parameters of the browsing profile utilized for the corresponding session and updating said profile parameters e.g. list of cookies, browsing history, success and failures at particular web sites, as well as keywords used for searches within the browsing session.

Figure 6:
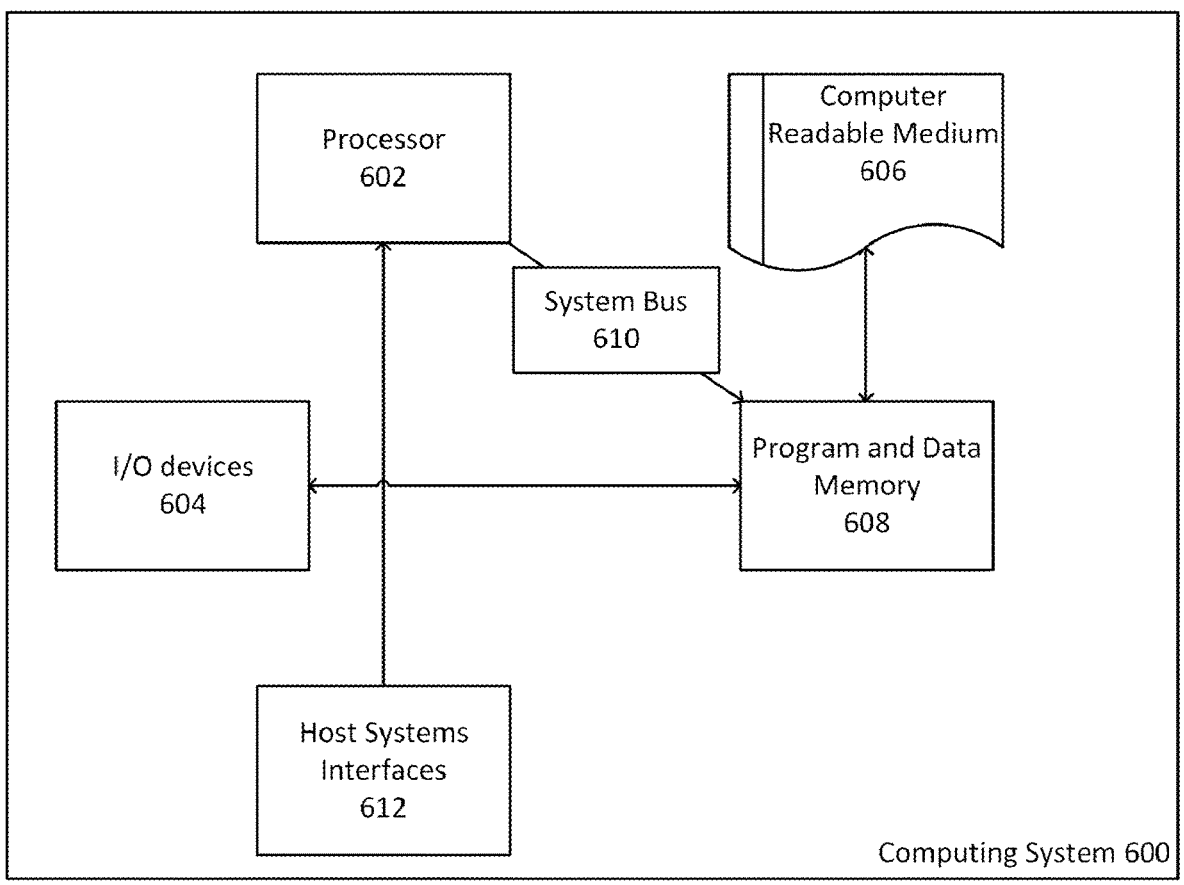
FIG. 6 is an exemplary computing system performing the methods disclosed.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 6 illustrates a computing system 600 in which a computer readable medium 606 may provide instructions for performing any of the methods disclosed herein.

Furthermore, the embodiments can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), NAND flash memory, a read-only memory (ROM), a rigid magnetic disk, and an optical disk. Some examples of optical disks include compact disk—read only memory (CD-ROM), compact disk—read/write (CD-R/W) and digital versatile disc (DVD).

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the computing system 600 to become coupled to other data processing systems, such as through host systems interfaces 612, or remote printers or storage devices through intervening private or public networks. Modems, cable modems, and Ethernet cards are just a few of the currently available types of network adapters.

Figure 7:
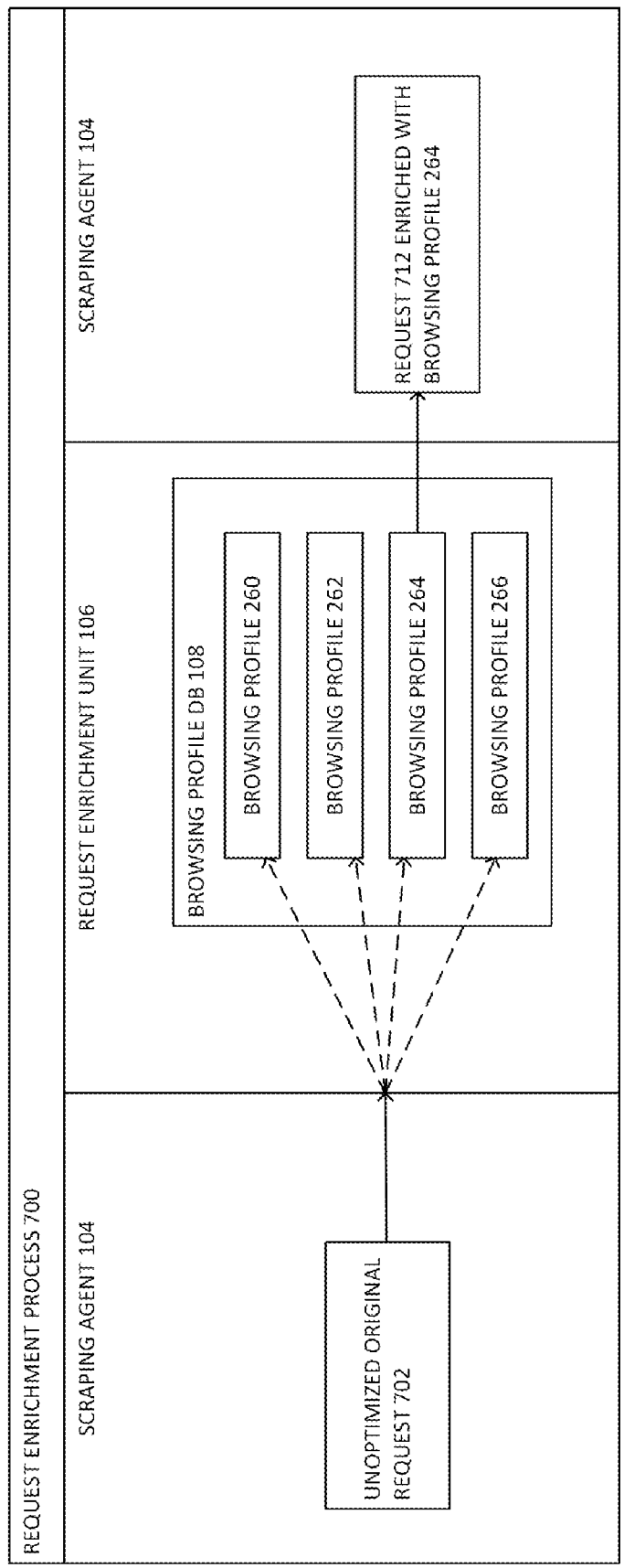
FIG. 7 depicts the system of assigning a browser profile to a web request and submitting the enriched request to the Target system.

FIG. 7 depicts the overview of a Browsing profile being selected for enriching an Unoptimized scraping request 702 with additional data preparing the request for a close scrutiny at a Target Web site, for the purpose of helping the Target web site to customize the response presented to the requesting party to contain the relevant data, helping the requesting user to select the best navigation path within the target website, and obtaining the best data desired by the user submitting the scraping request. The Unoptimized original request 702 is the input for the enrichment flow 700, the request contains the set of essential request parameters, e.g., at least the URL address, the headers, and the cookies. Custom HTTP headers may be used as the channel for communicating the supplementary requirements, e.g., geographical location for the IP address to be used for connecting to the Target web server. Upon examination of the request parameters the Request Enrichment Unit 106 approaches the Browsing profile DB 108 for selecting the Browsing profile most aligned with the parameters of the request 702 e.g. a profile with the geographical location declared identical, similar, or close to the geolocation of the request's Target. Upon the identification of such Browsing profile (e.g. 264) it is used for enriching the Original Request 702, producing the enriched and optimized Request 712 as the final output, which in turn is transmitted to the Scraping Agent 104 for further processing.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

It will be appreciated that some embodiments describe the use of one or more generic or specialized databases (such as "Browsing Profile DB", or similar), that contains a collection of information that is organized so that it can be easily accessed, managed and updated. Computer databases typically contain aggregations of data records or files. In the current case, databases usually store different information and statistics about the proxies or exit nodes, including, for example, information about utilization threshold of the exit node provider. Such databases can also contain information about the clients, requests performed, networks used, proxies used, types of proxies requested and similar data. Databases are structured to facilitate the storage, retrieval, modification, and deletion of data in conjunction with various data-processing operations.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

What is claimed is:

1. A method of creating a browsing profile for optimizing scraping requests comprising:
   creating, in bulk or individually, a browsing profile within a browsing profile database; and
   populating the browsing profile with at least one static parameter and at least one respective static value according to a parameters compatibility ruleset, and
   populating the browsing profile with at least one dynamic parameter according to the parameters compatibility ruleset;
   updating the at least one dynamic parameter of the browsing profile and at least one respective dynamic value with enrichment data derived from response data collected during regular scraping sessions, and,
   updating the at least one dynamic parameter of the browsing profile and the at least one respective dynamic value with enrichment data derived from the response data of synthetic scraping sessions;

wherein the browsing profile comprises at least one dynamic and one static parameter;

wherein the at least one static parameter comprises one of the following: operating system, browser, browser version, browser plugins, browser fonts, browser languages, screen resolution, country, state, city, timezone information, static transport layer security (TLS) parameters, and rules by which parameter value combinations abide;

wherein the at least one dynamic parameter comprises one of the following: cookie jar, browsing history, success and failures at particular web sites, keywords used for searches within the browsing session, TLS session state, content of local storage of the browser, content of local cache, and rules by which combinations abide.

2. A method of optimizing a scraping request with browsing profile parameters comprising:

accepting, by a service provider infrastructure, a scraping request from a user device;

requesting, by a scraping agent from a request enrichment unit, a browsing profile from a browsing profile database;

selecting, by the request enrichment unit, from the browsing profile database, a selected browsing profile closest aligned with parameters of the scraping request;

providing, by the request enrichment unit, the selected browsing profile to the scraping agent;

combining the scraping request with the selected browsing profile to form a combined request; and, sending the combined request to a target.

3. The method of claim 2 wherein at least one static parameter and at least one dynamic parameter are each added to the scraping request from the selected browsing profile.

4. The method of claim 2 wherein the browsing profile is used for a single user request to the target.

5. The method of claim 2 wherein the browsing profile is used for multiple requests to the target within a same or independent scraping session.

6. The method of claim 2 wherein the browsing profile is locked while being used for a request, or multiple requests, to a target, to avoid another request obtaining and utilizing the browsing profile.

7. The method of claim 2 wherein the request is executed by a scraping application within the scraping agent.

8. The method of claim 2 wherein enrichment data for the at least one dynamic parameter of the browsing profile and at least one respective dynamic value is derived from response data collected by:

receiving a response to the request from the target;

dissecting the response by the scraping agent to identify and extract data relevant for updating the browsing profile;

conveying the data to the request enrichment unit for updating the at least one dynamic parameter of the profile within the browsing profile database.

9. The method of claim 2 wherein if the target returns an error response, the data for updating the browsing profile is collected by examining the error response by the scraping agent.

10. The method of claim 2, wherein if an error response is received from the target, an alternative browsing profile is requested by the scraping agent, with the request enrichment unit selecting an appropriate profile record, and passing the profile record to the scraping agent where the scraping request is combined with the alternative browsing profile and sent to the target.

11. The method of claim 2, wherein the combined request is sent to the target through a proxy.

12. The method of claim 2 wherein synthetic data for updating the at least one dynamic parameter of the browsing profile and at least one respective dynamic value is derived from response data collected by:

generating a synthetic scraping request within the request enrichment unit;

submitting the synthetic scraping request by the request enrichment unit to a synthetic agent;

performing, by the synthetic agent, a scraping session with the synthetic scraping request;

collecting, within the scraping session response, the data that is relevant for updating the browsing profile;

updating the dynamic parameters of the browsing profile utilized for the corresponding session with the data collected.

13. The method of claim 2 wherein prior to accepting the original request, the method further comprises:

creating, in bulk or individually, a browsing profile within the browsing profile database;

populating the browsing profile with at least one static parameter and at least one respective static value according to a parameters compatibility ruleset, and populating the browsing profile with at least one dynamic parameter according to the parameters compatibility ruleset;

updating the at least one dynamic parameter of the browsing profile and at least one respective dynamic value with enrichment data derived from the response data collected during regular scraping sessions, updating the at least one dynamic parameter of the browsing profile and at least one respective dynamic value with the enrichment data derived from the response data of synthetic scraping sessions.

14. The method of claim 13, wherein the at least one static parameter, as well as the at least one respective static value, are updated within the parameters compatibility ruleset.

15. The method of claim 14, wherein upon the updating of the at least one static parameter and the at least one respective static value within the parameters compatibility rules, part of the browsing profiles contained within the browsing profile database are updated with new parameters and respective values.

16. The method of claim 9 wherein the browsing profile is marked for a period of inactivity.

17. A system of creating browsing profiles for optimizing scraping requests, comprising:

a browsing profile database, operable to create, in bulk or individually, a browsing profile, to populate the browsing profile with at least one static parameter and the at least one respective static value according to a parameters compatibility ruleset, to populate the browsing profile with at least one dynamic parameter according to the parameters compatibility ruleset, whereas corresponding values are left empty, update the at least one dynamic parameter of the browsing profiles and the at least one respective dynamic value with enrichment data derived from response data collected during regular scraping sessions, update the at least one dynamic parameter of the browsing profile and the at least one respective dynamic value with enrichment data derived from the response data of synthetic scraping sessions;

a scraping agent, operable to dissect and convey the response identifying and extracting the data relevant for updating the browsing profile;

a request enrichment unit operable to update the at least one dynamic parameter of the browsing profile within the browsing profile database;

wherein the at least one static parameter comprises one of the following: operating system, browser, browser version, browser plugins, browser fonts, browser languages, screen resolution, country, state, city, timezone information, static transport layer security (TLS) parameters, and rules by which parameter value combinations abide;

wherein the at least one dynamic parameter comprises one of the following: cookie jar, browsing history, success and failures at particular web sites, keywords used for searches within the browsing session, TLS session state, content of browser's local storage, content of local cache, and rules by which combinations abide.

18. The system of claim 17 wherein the enriching a scraping request with a browsing profile further comprises:
    accepting, by a service provider infrastructure, an original request from a user device;
    requesting, by the scraping agent from the request enrichment unit, a browsing profile aligned with parameters of a scraping request;
    selecting, by the request enrichment unit, the browsing profile for the original request from the browsing profile database;
    providing, by the request enrichment unit, the selected browsing profile to the scraping agent;
    combining the original request with the selected browsing profile to form a combined request; and,
    sending the combined request to a target.

19. The system of claim 17 wherein enrichment data for the at least one dynamic parameter of the browsing profile and the at least one respective dynamic value is derived from the response data collected by:
    receiving a response to the request from the target;
    dissecting the response by the scraping agent to identify and extract data relevant for updating the browsing profile;
    conveying the data to the request enrichment unit for updating the at least one dynamic parameter of the profile within the browsing profile database.

20. The system of claim 17 wherein upon the updating of the at least one static parameter and the at least one respective static value within the parameters compatibility rules, a selection of browsing profiles contained within the browsing profile database are updated with new parameters and values.

21. The system of claim 17 wherein synthetic enrichment data for the at least one dynamic parameter of the browsing profile and the at least one respective dynamic value is derived from response data collected by:
    generating a synthetic scraping request within the request enrichment unit;
    submitting the synthetic scraping request by the request enrichment unit to a synthetic agent;
    performing, by the synthetic agent, a scraping session with the synthetic scraping request;
    collecting, within the scraping session response, the data that is relevant for updating the browsing profile;
    updating the at least one dynamic parameter of the browsing profile, utilized for the session, with the data collected.

* * * * *